United States Patent
Gusler et al.

(10) Patent No.: US 7,120,671 B2
(45) Date of Patent: Oct. 10, 2006

(54) METHOD AND SYSTEM FOR MULTIPLE-PARTY, ELECTRONIC MAIL RECEIPTS

(75) Inventors: Carl Phillip Gusler, Austin, TX (US); Rick Allen Hamilton, II, Charlottesville, VA (US); Harry Schatz, McLean, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 10/626,191

(22) Filed: Jul. 24, 2003

(65) Prior Publication Data

US 2005/0021650 A1    Jan. 27, 2005

(51) Int. Cl.
*G06F 15/16*    (2006.01)
(52) U.S. Cl. ...................................................... 709/206
(58) Field of Classification Search ........ 709/200–206, 709/217–224
See application file for complete search history.

(56) References Cited

U.S. PATENT DOCUMENTS

| | | | |
|---|---|---|---|
| 5,476,420 A | 12/1995 | Manning | |
| 5,748,884 A | 5/1998 | Royce et al. | |
| 5,790,790 A | 8/1998 | Smith et al. | |
| 5,801,700 A * | 9/1998 | Ferguson | 715/748 |
| 5,850,520 A | 12/1998 | Griebenow et al. | |
| 5,878,230 A | 3/1999 | Weber et al. | |
| 6,138,146 A | 10/2000 | Moon et al. | |
| 6,138,158 A * | 10/2000 | Boyle et al. | 709/225 |
| 6,182,059 B1 | 1/2001 | Angotti et al. | |
| 6,199,106 B1 | 3/2001 | Shaw et al. | |
| 6,223,168 B1 | 4/2001 | McGurl et al. | |
| 6,370,575 B1 | 4/2002 | Dougherty et al. | |
| 6,442,600 B1 * | 8/2002 | Anderson | 709/217 |
| 6,449,635 B1 | 9/2002 | Tilden et al. | |
| 6,477,647 B1 | 11/2002 | Venkatraman et al. | |
| 6,988,129 B1 * | 1/2006 | Quine | 709/206 |
| 6,999,989 B1 * | 2/2006 | DeLaCruz | 709/204 |
| 2002/0040387 A1 | 4/2002 | Lessa et al. | |
| 2002/0099777 A1 * | 7/2002 | Gupta et al. | 709/206 |
| 2002/0143881 A1 | 10/2002 | DeLaCruz | |
| 2003/0135565 A1 * | 7/2003 | Estrada | 709/206 |
| 2004/0221012 A1 * | 11/2004 | Heumesser | 709/206 |

FOREIGN PATENT DOCUMENTS

| | | |
|---|---|---|
| JP | 2002164911 A2 | 6/2002 |
| JP | 22063113 A2 | 2/2003 |
| WO | WO 01/97432 A2 | 12/2001 |

(Continued)

OTHER PUBLICATIONS

GotMarketing, "GotMarketing Announces Viralocity," web page available at http://www.gotmarketing.com/corporate/press-releases/august_21_2002_1.html (Accessed May 1, 2003).

(Continued)

*Primary Examiner*—Moustafa M. Meky
(74) *Attorney, Agent, or Firm*—Stephen J. Walder, Jr.; David A. Mims, Jr.

(57) ABSTRACT

An example of a solution provided here comprises: receiving a message from a sender; providing the message to a recipient; and in response to a request from the sender, automatically transmitting multiple-party receipt notifications to a number of persons. Thus a number of persons may be notified that the recipient has been provided with the content of the message. In some cases, such a solution may comprise providing limits for the multiple-party receipt notifications.

23 Claims, 5 Drawing Sheets

FOREIGN PATENT DOCUMENTS

WO        WO 01/97432 A3     6/2002

OTHER PUBLICATIONS

Slavin, Urban Legend Zeitgeist, "Email Forwarding for Fun and Profit Redux," web page available at http://www.urbanlegends.com/ulz/emailtracking.html (Addessed May 1, 2003).

Visualware, "VisualRoute," web page available at http://www.visualware.com/visualroute/index.html (Accessed May 1, 2003).

Fajman, R., "An Extensible Message Format for Message Disposition Notifications," (RFC 2298) The Internet Society, Mar. 1998.

van der Eijk, "The ebXML Messaging Service," web site available at http://www.xml.com/lpt/a/ws/2003/03/18/ebxml.html (Accessed May 1, 2003) OASIS, "Message Service Specification Version 2.0," Organization for the Advancement of Structured Information Standards, Apr. 1, 2002.

* cited by examiner

METHOD AND SYSTEM FOR MULTIPLE-PARTY, ELECTRONIC MAIL RECEIPTS

CROSS-REFERENCES TO RELATED APPLICATIONS, AND COPYRIGHT NOTICE

The present application is related to a co-pending patent application entitled E-Mail Route Trace Functionality, filed on even date herewith. This co-pending patent application is assigned to the assignee of the present application, and herein incorporated by reference. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to electronic mail (e-mail), and more particularly to methods and systems for notifying users of the disposition of messages.

BACKGROUND OF THE INVENTION

In many situations, persons besides the original sender of an e-mail message would like to know whether a certain recipient has read the message. This is true of persons in a collaborative environment, for example, who need to share information regarding a project. This is true of persons in a group, working together to perform services for a client, when a group member sends a message to the client concerning scheduling, for example. Later communications with the client will be more productive, if the group members know whether the client has read the scheduling message. However, conventional e-mail implementations, using conventional receipt notifications, merely inform the original sender that a recipient has read the message. Thus there is a need for systems and methods that address this gap in conventional approaches to e-mail.

SUMMARY OF THE INVENTION

An example of a solution to problems mentioned above comprises: receiving a message from a sender; providing the message to a recipient; and in response to a request from the sender, automatically transmitting multiple-party receipt notifications to a number of persons. Thus a number of persons may be notified that the recipient has been provided with the content of the message. In some cases, such a solution may comprise providing limits for the multiple-party receipt notifications.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

The examples that follow involve the use of one or more computers, and may involve the use of one or more communications networks, or the use of various devices capable of handling e-mail, such cell phones or two-way pagers. The present invention is not limited as to the type of computer or other device on which it runs, and not limited as to the type of network used.

The following are definitions of terms used in the description of the present invention and in the claims:

"Application" means any specific use for computer technology, or any software that allows a specific use for computer technology.

"Comparing" means bringing together for the purpose of finding any likeness or difference, including a qualitative or quantitative likeness or difference.

"Component" means any element or part, and may include elements consisting of hardware or software or both.

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Multiple-party receipt notifications" means any notification messages that report to multiple parties the disposition of another message after it has been successfully delivered to a recipient.

"Notification" means any notification message that reports the disposition of another message. This is traditionally called a "Message Disposition Notification" (MDN), "read receipt," "acknowledgment," or "receipt notification." These traditional terms may be used here, even though the details of MDN's described here differ from traditional MDN'S.

"Output" or "Outputting" means producing, transmitting, or turning out in some manner, including but not limited to printing on paper, or displaying on a screen, writing to a disk, or using an audio device.

"Selection signal" means any signal from a user who is making a selection, utilizing any input device, including a keyboard, speech-recognition interface, or pointing device such as a track ball, a joy stick, a touch-sensitive tablet or screen, or a mouse.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

"Tag" means any element, label, field, or value that conveys information about a message, or about how to handle a message.

Figure 1:
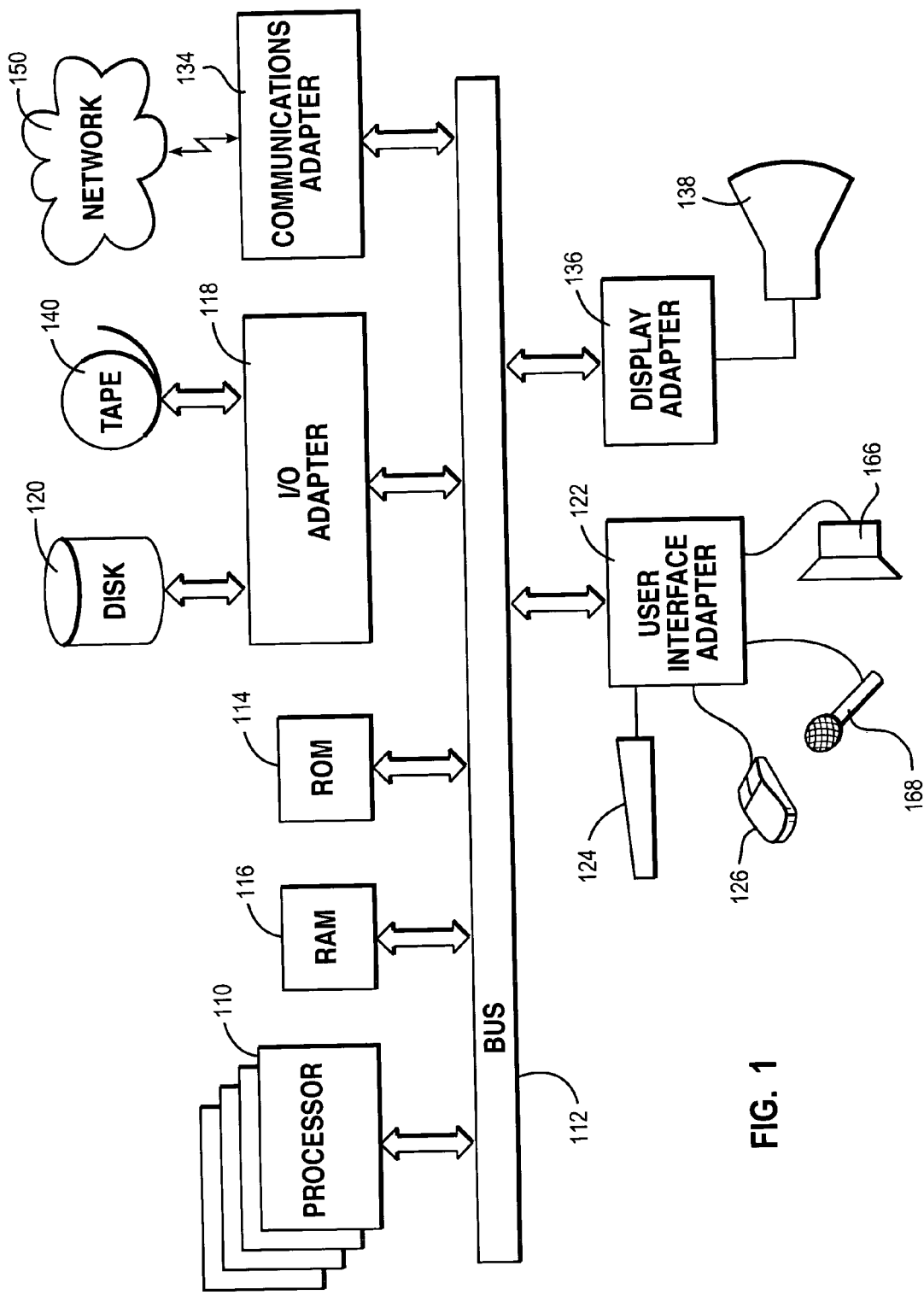
FIG. 1 illustrates a simplified example of a computer system capable of performing the present invention.

FIG. 1 illustrates a simplified example of an information handling system that may be used to practice the present invention. The invention may be implemented on a variety of hardware platforms, including embedded systems, cell phones, two-way pagers, hand-held computers, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a communications network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
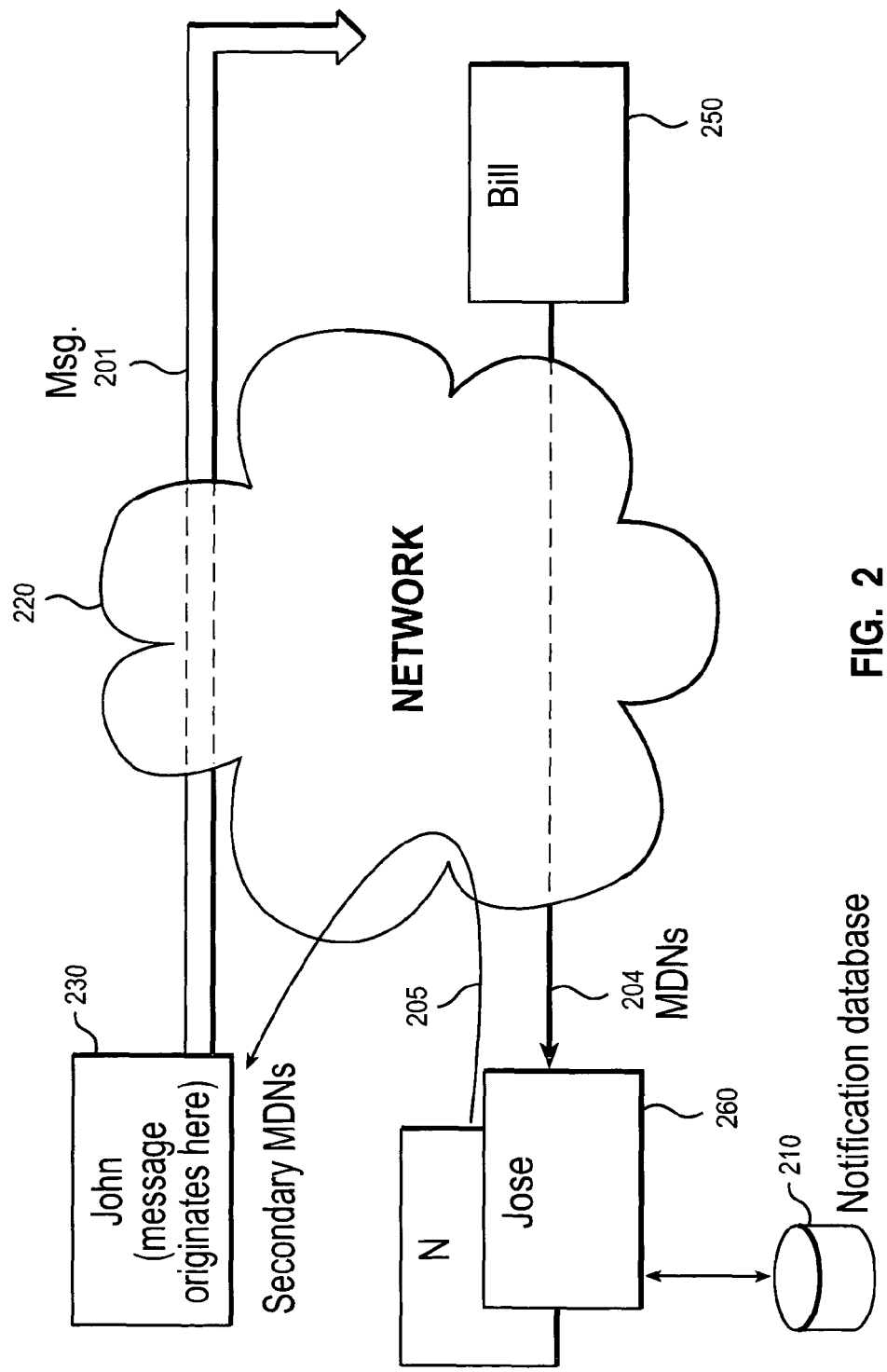
FIG. 2 is a high-level block diagram illustrating an example of a method and system for providing e-mail services according to the teachings of the present invention.

FIG. 2 is a high-level block diagram illustrating an example of a method and system for providing e-mail services according to the teachings of the present invention. A system like this could operate via an intranet, or the Internet, for example, or via some other network (shown at 220). At the upper left, a user named John (not shown) is the original sender of an e-mail message 201. The system allows e-mail communication from John, using sender's e-mail client 230, to a recipient named Bill (not shown) who utilizes recipient's e-mail client 250. The sender's e-mail client 230 receives input from the sender, requesting multiple-party receipt notifications, for an e-mail message 201. The e-mail message 201 is transmitted to the recipient's e-mail client 250, through network 220. In this example, Bill is the original recipient. Bill is collaborating on a project with multiple parties Jose and N at 260, who need to know when Bill has been provided with the content of message 201.

An e-mail notification message that reports the disposition of another message, after it has been successfully delivered to a recipient, is traditionally called a "Message Disposition Notification" (MDN), "read receipt," "acknowledgment," or "receipt notification." These terms are used here, even though the details of MDN's described here differ from traditional MDN's. In this example, multiple-party receipt notifications are automatically transmitted (MDN's at 204) from the recipient's e-mail client at 250 to multiple parties' e-mail clients at 260, through network 220.

To summarize the example so far, FIG. 2 involves the following: receiving at 250 a message 201 from a sender at 230; providing the message to a recipient at 250; and in response to a request from a sender (at 230), automatically transmitting multiple-party receipt notifications (204) to a number of persons (at 260). Thus those persons may be notified that the recipient at 250 has been provided with the content of the message 201.

Continuing with details of the example in FIG. 2, Jose and any number of other persons (symbolized by "N," because the others could be numbered from 1 to N) utilize e-mail clients at 260. E-mail clients at 230, 250 and 260 may comprise any software and hardware capable of handling e-mail.

The example in FIG. 2 involves providing to a user (e.g. Jose at 260) information (based on MDN's 204) as to who has been provided with the content of the e-mail message 201. This information would identify Bill, who was provided with the message content via his e-mail client at 250. Storing and updating this information may also be involved. This may be accomplished by Jose at 260 saving the MDN's 204 as they arrive. Storing and updating the information may also be organized and automated to some degree (using notification database 210 for example). Notification database 210 may be a component of e-mail client 260, or notification database 210 may be separate from, but accessible to, e-mail client 260.

The example in FIG. 2 involves transmitting a secondary receipt notification 205 to the sender at 230. The secondary receipt notification 205 notifies the sender that one of the plurality of persons at 260 received one of the multiple-party receipt notifications 204. Thus at any point in time the sender at 230 would have a complete view of communications in this example (i.e. a complete view of who has read message 201, or who has been notified that the recipient at 250 has been provided with the content of the message 201). A conventional MDN from 250 to 230 (not shown) may play a role here, in giving sender at 230 a complete view of who has read message 201.

Figure 3:
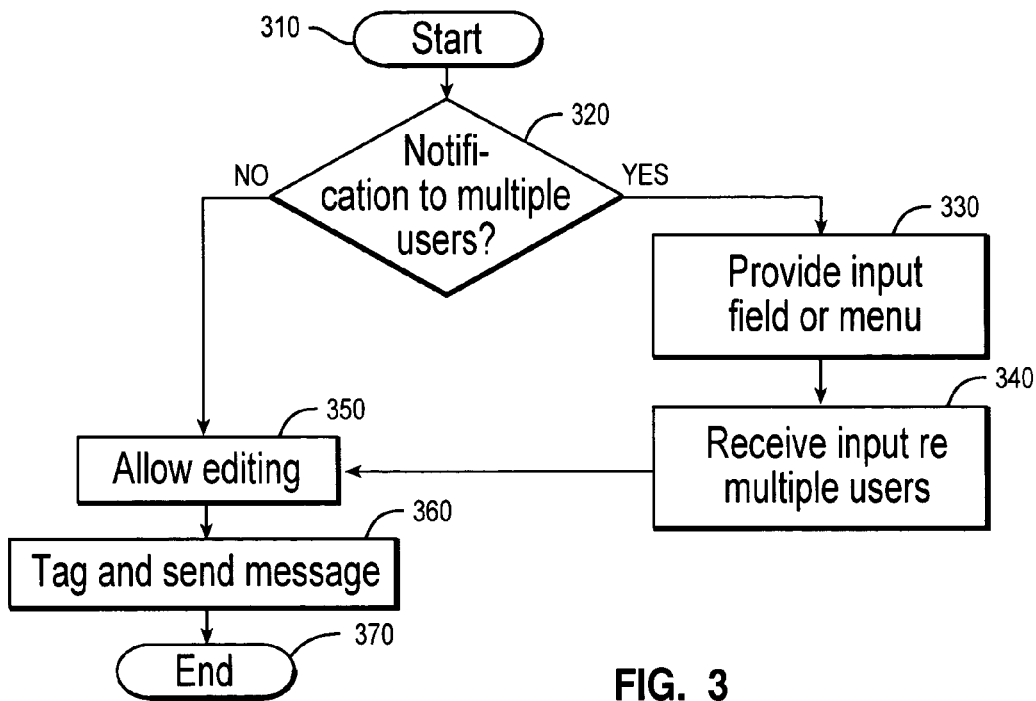
FIG. 3 is a flow chart illustrating an example of a method for sending electronic mail, according to the teachings of the present invention.

FIG. 3 is a flow chart illustrating an example of a method for sending electronic mail, according to the teachings of the present invention. The process starts at 310, which may represent a user (sender) launching an e-mail application in preparation for sending electronic mail to one or more recipients. At decision 320, the "No" branch may be taken, for example if the sender decides to send the message without requesting any multiple-party receipt notifications. In that case, the sender would proceed directly to writing and editing the message (350) and sending the message with conventional tags (360).

On the other hand, if any multiple-party receipt notifications are desired, the "Yes" branch may be taken at decision 320, symbolizing receiving from the sender a request for multiple-party receipt notifications, for an e-mail message. Then the next step in this example is providing an input field or menu, 330. This is a way of receiving input from the sender, for multiple-party receipt notifications, and other options for the e-mail message. One possibility is providing a set of menu entries to the sender. Another possibility is automatically providing default behavior, in the absence of contrary input from the sender.

The input is received from the sender at 340. This may involve receiving text input of names and e-mail addresses, or receiving from the sender a selection signal, indicating that a number of persons are to automatically receive the multiple-party receipt notifications. This may involve receiving from the sender a selection signal, indicating that these persons also are to receive the e-mail message.

Next, writing and editing the message is allowed, 350. Then the message is tagged and sent at 360. This involves creating at least one tag for the message, indicating that a plurality of persons are to automatically receive the multiple-party receipt notifications, and sending the message with the tag. Creating a tag is in response to the original sender's request at 320 for multiple-party receipt notifications. The message is tagged and sent to one or more recipients. This may involve sending the message to the group of persons who will receive multiple-party receipt notifications. For example, an e-mail application may use Transmission Control Protocol (TCP) and deliver a separate copy of the message to each recipient's mailbox. The proper tag is applied to each copy. With the sending accomplished, the process ends at 370 in this example. See also FIG. 5 for another example of a user interface, and FIG. 4 concerning output for persons receiving multiple-party receipt notifications.

Regarding FIG. 3, the order of the operations described above may be varied. For example, it is within the practice of the invention for receiving input at block 340 to occur after, or simultaneously with, editing at block 350. Those skilled in the art will recognize that blocks in FIG. 3 could be arranged in a somewhat different order, but still describe the invention. Blocks could be added to the above-mentioned diagram to describe details, or optional features; some blocks could be subtracted to show a simplified example.

Turning now to details that may be involved in FIG. 3, consider the operation where the message is tagged and sent at block 360. An implementation of multiple-party receipt notifications may use tags to convey information about how to handle a message. Some predefined, general-purpose tags for e-mail messages are well-known, but the tags described here are new, and they convey information about new kinds of message handling. Various implementation methods may be used for the present invention. Two implementation factors may be considered. One factor is incorporation of metadata into the message, including a request for multiple-party receipt notifications, and the e-mail addresses of persons who are to automatically receive the multiple-party receipt notifications. For example, consider a hypothetical field named "Multi-Notification," upon which special actions may be taken. This might be added to a message, and if populated would contain the e-mail addresses of persons who are to automatically receive multiple-party receipt notifications. A second factor is the reading of such metadata by an e-mail application.

The present invention may use any tags that are understood by both the sender's software and the recipient's software. A unique implementation scheme could be used for an organization's internal e-mail system, for example. On the other hand, the present invention may be implemented by building upon well-known standards for e-mail.

Some examples of standards are: Simple Mail Transfer Protocol (SMTP), Multipurpose Internet Mail Extensions (MIME), and Secure Multipurpose Internet Mail Extensions (S/MIME). Regarding such standards, reference is made to the following documents: Jonathan B. Postel, Request for Comments (RFC) #821, *Simple Mail Transfer Protocol*, 1982; David H. Crocker, RFC #822, *Standard for the Format of ARPA Internet Text Messages*, 1982; J. Palme, RFC #2076, Common Internet Message Headers, 1997; and R. Fajman, RFC #2298, *An Extensible Message Format for Message Disposition Notifications*, 1998. An Internet e-mail message consists of two parts: a header and a body. A header may be used to implement the present invention. A header has a collection of field-value pairs that convey information about the message. For example, a hypothetical field named "Multi-Notification" might have values of "jose@acmecorp.com" and "n@acmecorp.com" to identify the e-mail addresses of persons who are to automatically receive multiple-party receipt notifications.

One example given in RFC #2298 is the field "Disposition-Notification-To," with a value of at least one mailbox. However, "confirmation from the user SHOULD be obtained (or no MDN sent) . . . if there is more than one distinct address in the Disposition-Notification-To header," according to RFC #2298. A Disposition-Notification-To header in a message is merely a request for a Message Disposition Notification (MDN).

Extension fields provide a way to implement multiple-party receipt notifications by building upon the standard described in RFC #2298. Extension-field names beginning with "X-" are not defined as standard fields; such names are reserved for experimental use, according to RFC #2298. The name of the application should follow the "X-."

For example, consider an extension field named "X-Multimail-Multi-Notification-To," with a value of two or more mailboxes to identify the e-mail addresses of persons who are to automatically receive multiple-party receipt notifications. This example is for an e-mail application named "Multimail" that would implement multiple-party receipt notifications. This example assumes that this tag is applied to a message by the original sender's software (at block 360 of FIG. 3), and understood by the recipient's software. Then the recipient's software automatically transmits MDN's to the e-mail addresses of persons who are to automatically receive multiple-party receipt notifications.

Continuing with details that may be involved in FIG. 3, extensible markup language (XML), provides a way of containing and managing information that is designed to handle data exchange among various data systems. Thus it is well-suited to implementation of the present invention. Reference is made to the book by Elliotte Rusty Harold and W. Scott Means, XML in a Nutshell (O'Reilly & Associates, 2001). As a general rule, XML messages use "attributes" to contain information about data, and "elements" to contain the actual data.

Multiple-party receipt notifications may be implemented by building upon an XML-based standard such as e-business XML (ebXML), and in particular the ebXML Messaging Service. Reference is made to an article by Pim van der Eijk, *The ebXML Messaging Service*, (O'Reilly & Associates, 2003), available at O'Reilly's XML.com web site. The ebXML Messaging Service specification extends the Simple Object Access Protocol (SOAP) specification to provide security and reliability features. The ebXML Messaging Service may be used to transfer messages over SMTP, Hypertext Transfer Protocol (HTTP), or some other communications protocol. There are no restrictions on the message content. Users have a choice of ebXML Messaging Service implementations, provided by different vendors, including open source implementations. Regarding receipt notifications, ebXML Messaging Service defines an optional <eb:AckRequested> extension element for the <SOAP: Header>. The responding message handler can send a message containing an <eb:Acknowledgment> extension element, with an <eb:RefToMessageId> element to specify which message is being acknowledged.

Reference is made to the specification by the Organization for the Advancement of Structured Information Standards (OASIS) Technical Committee, *ebXML Messaging Services Specification* 2.0 (OASIS 2002), which gives the following example of the AckRequested element, with this comment: "The Acknowledgment element generated MUST be targeted to the ebXML MSH node acting in the role of the From Party along the reverse message path . . . ." An Acknowledgment Message is requested of a message handler (MSH) node acting in the role of the To Party in the following example:

<eb:AckRequested SOAP:mustUnderstand="1" eb:version="2.0" eb:signed="false"/>

The ebXML Messaging Service specification gives the following rule: "If an AckRequested element is present, then generate an Acknowledgment Message in response (this may be as part of another message)."

The ebXML Messaging Service specification gives the following example of an Acknowledgment element targeted at the To Party MSH:

<eb:Acknowledgment SOAP:mustUnderstand="1"eb:version="2.0">
<eb:Timestamp>2001-03-09T12:22:30</eb:Timestamp>
<eb:RefToMessageId>323210:e52151ec74:7ffc@xtacy</eb:RefToMessageId>
<eb:From><eb:PartyId>uri:www.example.com</eb:PartyId></eb:From>
</eb:Acknowledgment>

According to OASIS *ebXML Messaging Services Specification* 2.0, if an Acknowledgment Message is being sent, then the value of the MessageHeader elements are set as follows: "The To element MAY be populated with the From element extracted from the message received . . . ."

Multiple-party receipt notifications may be implemented by building upon the ebXML Messaging Service as follows. For example, consider a new extension element named "MultiAckRequested." This example assumes that this tag is applied to a message by the original sender's software (at block 360 of FIG. 3), and understood by the recipient's software. New behavior for multiple-party receipt notifications could be specified, so that an e-mail application follows a rule such as: "If a MultiAckRequested element is present, then generate Acknowledgment Messages in response, and send them directly to the specified e-mail addresses (of persons who are to automatically receive multiple-party receipt notifications)." The email application populates the "To" element with a list of multiple users to receive receipt notifications. The list of users may be found in a MultiAckRequested element extracted from the message received.

Figure 4:
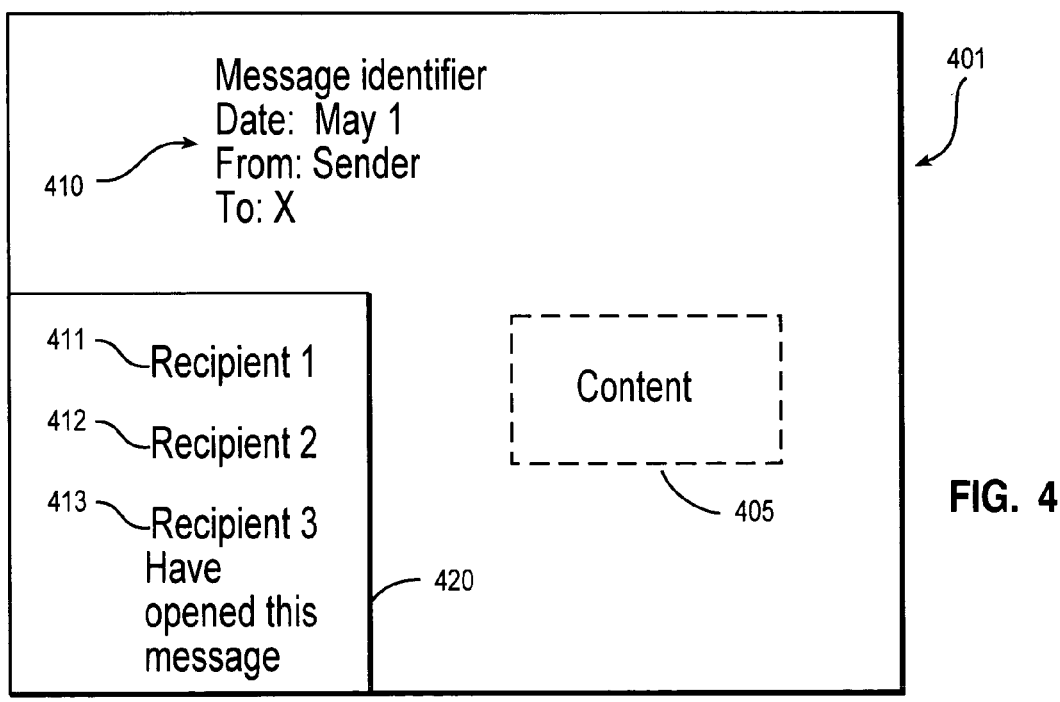
FIG. 4 is a diagram illustrating an example of a user interface, providing output for a user, according to the teachings of the present invention.

FIG. 4 is a diagram illustrating an example of a user interface, providing output for a user, according to the teachings of the present invention. To begin with an overview, FIG. 4 shows a user interface 401 suitable for multiple users (such as Jose and N at 260 in FIG. 2). The example in FIG. 4 involves output, based on receiving multiple-party receipt notifications. FIG. 4 shows an example of providing to a user a representation (at 410 or 405 or both) of the e-mail message, together with information (at 420) as to who has perceived the content of the e-mail message, or who has been provided with the content of an e-mail message. A user interface like this could be used with a method and system like the examples shown in FIGS. 2–3. A user interface like this could be displayed with text and graphics, as shown at 401. An audible interface also could be provided to the sender via audio output.

Turning to details of FIG. 4, interface 401 provides output, based on receiving multiple-party receipt notifications. At the top of interface 401 is a representation of a message, at 410, including a message identifier such as a "subject" description, or an identification number. A multiple-party receipt notification may be matched with a message by comparing a message identifier in a message with a message identifier in a multiple-party receipt notification. Also included in the representation of the message at 410 are the date of the message and the names of sender and recipient. In another format, an interface like 401 may provide representations of a number of messages. A user may pick a message of interest from a list, for example.

In interface 401 there is a section 420 showing who has opened this message. In this example, three recipients listed at 411, 412, and 413 have opened this message. An optional feature is providing or displaying at least some of the content of a message at 405, as a representation of a message. The content, visible or accessible at 405, may include text, graphics, audio content or video content. In other words, FIG. 4 shows an example of means for providing to a user a representation (at 410 or 405 or both) of the e-mail message, together with information (at 420) as to who has been provided with the content of the e-mail message.

Information provided in section 420, showing who has opened this message, may change from time to time. This would involve storing and updating the information, as discussed above in connection with notification database 210 in FIG. 2. Section 420 may serve as means for signaling that the content of the e-mail message has been provided to at least one recipient. Section 420 may serve as means for signaling that the e-mail message has been received and deleted by (not necessarily opened by) at least one recipient. Section 420 may provide output based on one or more kinds of multiple-party receipt notifications such as:

(1) notifications reporting that the message has been sent somewhere in some manner (e.g. forwarded or faxed),
(2) notifications reporting that the message contents were provided to someone reading a recipient's mailbox,
(3) notifications reporting deletion (perhaps without display) of the message.

With an interface like 401, spoken input could be received from the sender via a speech recognition interface, or the sender might mark a word displayed on a screen. A user's input might specify a particular message that the user is interested in, or specify a particular behavior for the interface 401, for example.

Figure 5:
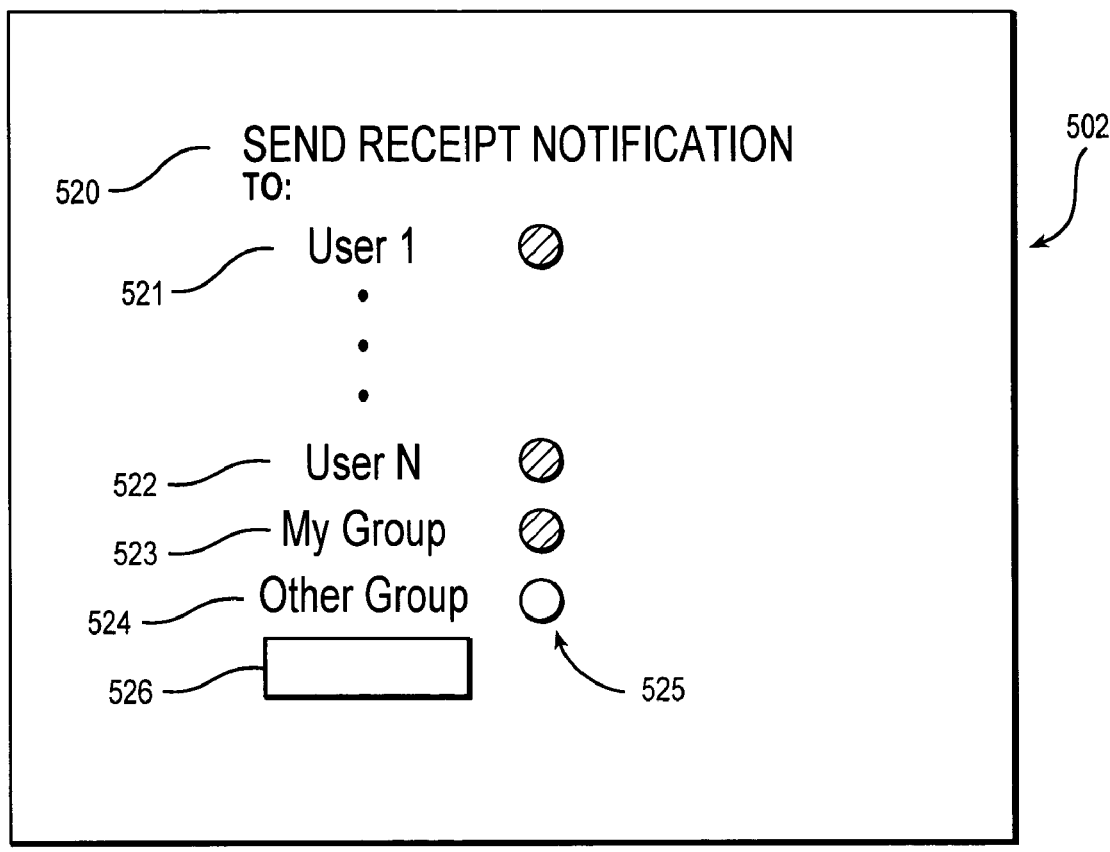
FIG. 5 is a diagram illustrating another example of a user interface.

FIG. 5 is a diagram illustrating another example of a user interface. Menu 502 may serve as means for receiving from a sender a request for multiple-party receipt notifications, for an e-mail message. FIG. 5 shows an example of means for receiving input (in column 525 or box 526) from a sender, specifying two or more persons to receive multiple-party receipt notifications for an e-mail message. A menu could be displayed with text and graphics, as shown at 502. An audible menu also could be provided to the sender via audio output. Spoken input also could be received from the sender via a speech recognition interface, or the sender might mark a word displayed on a screen. These examples are ways of receiving input from the sender to create a tag. These examples could be used with a method and system like the ones shown in FIGS. 2–3. Menu 502 may serve as a user interface for an email client. An email client may serve as means for creating at least one tag, indicating that two or more persons are to receive the multiple-party receipt notifications, and means for sending the message with the tag.

At the top of menu 502 is a request for input, 520. In menu 502 there are names that may be selected, for "User 1," 521, "User N," 522, "My Group," 523, and "Other Group," 524. The name "User N" symbolizes that there may be names for any number of users, numbered 1–N for example. A darkened circle in column 525 shows input from the sender to mark a name displayed on a screen. This represents familiar graphical input techniques, such as positioning a cursor or pointer over a radio button or check box, and clicking on it to send a selection signal. Another possibility is automatically providing default settings ("My Group," 523, for example), in the absence of contrary input from the sender. There could be additional input possibilities, such as an input space for entering text (shown by box 526 at the bottom of menu 502).

A menu like 502 may serve as means for setting limits, suitable for multiple users (such as Jose and N at 260 in FIG. 2). For example, a user may set a permissions policy that allows transmitting multiple-party receipt notifications only to a group of regular collaborators ("My Group," 523, for example). See also the description of limits below, regarding FIG. 6.

Figure 6:
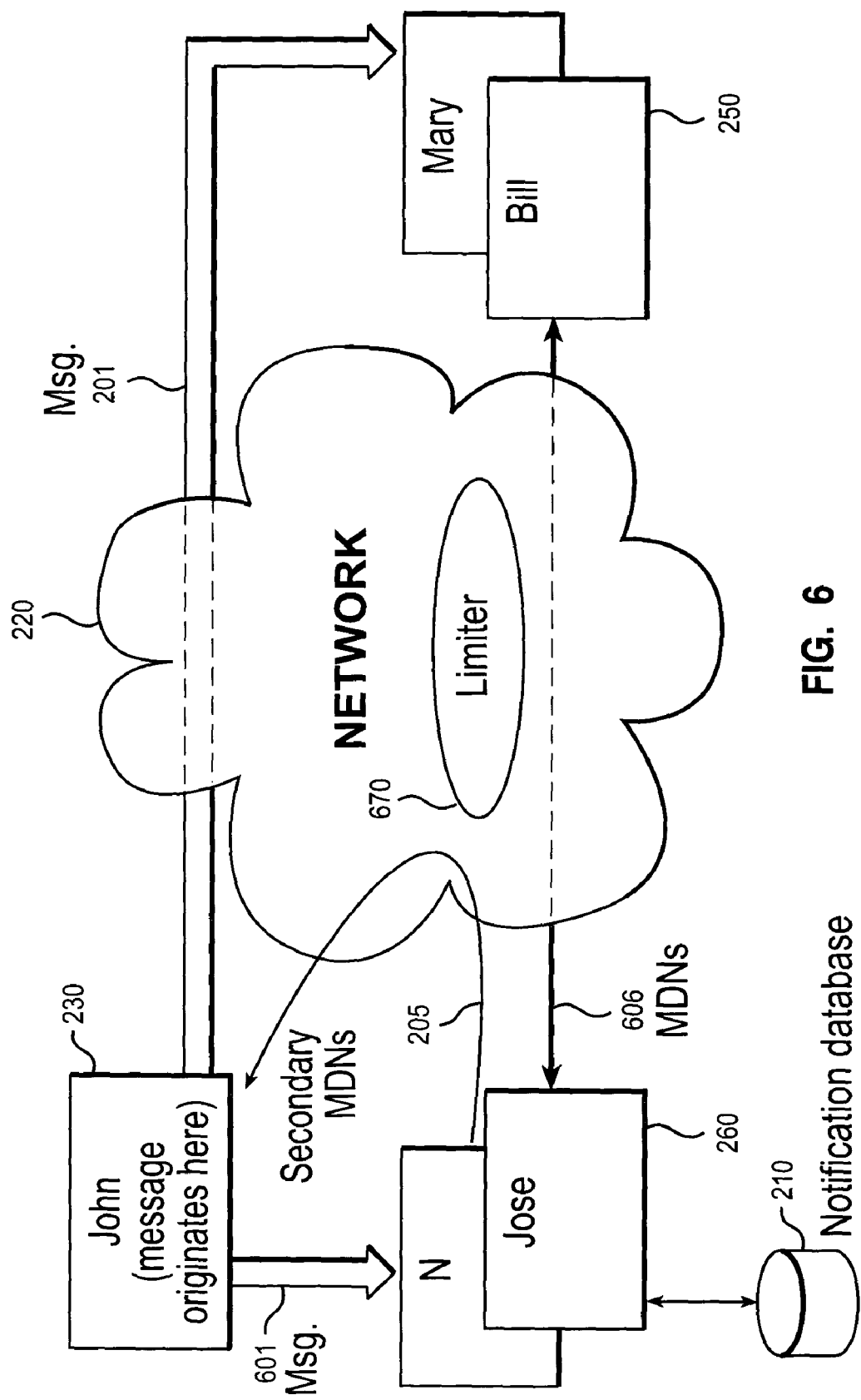
FIG. 6 is a high-level block diagram illustrating another example of a method and system for providing e-mail services.

FIG. 6 is a high-level block diagram illustrating another example of a method and system for providing e-mail services, according to the teachings of the present invention. Consider an example of a collaborative environment, where it may be useful for group members Mary and Bill at 250, and Jose and N at 260, to share information as to who has been provided with the content of an e-mail message sent to the group (via pats shown by arrows 201 and 601). Each e-mail client at 250 and 260 may serve as means for providing the message to a recipient. Each e-mail client at 250 and 260 may serve as means responsive to a tag, for automatically transmitting the multiple-party receipt notifications (606) to other group members at 250 and 260. Each e-mail client at 250 and 260 may serve as means for providing to a user a representation of the e-mail message, together with information as to who has been provided with the content of the e-mail message. Storing and updating the information may be involved (using notification database 210 for example). In other words, the example in FIG. 6 involves multiple users transmitting the multiple-party receipt notifications (606) to multiple users.

Each e-mail client at 260 may serve as means for transmitting a secondary receipt notification 205 to the sender at 230. This notifies the sender that one of the group members at 250 received one of the multiple-party receipt notifications 606.

The example in FIG. 6 involves providing limits for multiple-party receipt notifications. Providing limits (symbolized by limiter 670) for multiple-party receipt notifications may involve one or more limiting actions such as: disabling the multiple-party receipt notifications, limiting the content of the multiple-party receipt notifications, and limiting the multiple-party receipt notifications' operation, based on a domain policy or a permissions policy. Such policies may involve checking the location or identity of persons who are to receive the multiple-party receipt notifications, for example.

An e-mail client (at 250 or 260) may serve as means for providing limits. For example, consider means responsive to a user's request, for disabling the multiple-party receipt notifications (MDN's at 606). The e-mail client (at 250 or 260) enforces the disabling, by following a rule such as: "if the user requests the disabling of multiple-party receipt notifications, filter them out." Then the e-mail client will not display or save the multiple-party receipt notifications (MDN's at 606). As another example, consider means for limiting the content of the multiple-party receipt notifications. Mary at 250 may prefer to have only limited dealings with a large group at 260. Mary's e-mail client (at 250) may provide some privacy protection for Mary, by including in a multiple-party receipt notification only Mary's name, and not the e-mail address of her e-mail client (at 250). As another example, consider means for limiting the multiple-party receipt notifications' operation, based on a permissions policy. Jose at 260 may set a permissions policy that allows transmitting multiple-party receipt notifications (MDN's at 606) only to the group of Jose's regular collaborators. Jose's e-mail client (at 260) checks permissions before transmitting multiple-party receipt notifications (MDN's at 606) to other users. Jose's e-mail client (at 260) refuses to send MDN's in some cases, based on a rule such as "do not send the MDN to the other user, if the other user does not have permission to receive the MDN." Such a permissions policy may be similar to access permissions in UNIX, or a related operating system, for example.

In FIG. 6, limiter 670's position symbolizes that there are centralized ways to implement limits. Arrows passing through network 220 symbolize messages passing through various network components. Arrows 606 and 205, passing near limiter 670, symbolize that one or more components such as an e-mail routing system or a mail server may follow rules to impose limits on MDN's 606 and secondary MDN's 205. For example, consider means for limiting the transmitting of multiple-party receipt notifications, based on a domain policy. An e-mail routing system refuses to send MDN's in some cases, based on the domain of original sender's e-mail client 230, by following a rule such as "do not send the MDN if the message originates in domain X," or "do not send the MDN if the message originates outside of this corporate intranet."

In conclusion, we have shown examples of solutions that deliver information as to who has been provided with the content of an e-mail message.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the method.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A method for providing electronic mail (e-mail) services, said method comprising:
   receiving from a sender a request for multiple-party receipt notifications, for an e-mail message;
   in response to said request, creating at least one tag for said message, indicating that a plurality of persons are to automatically receive said multiple-party receipt notifications; and
   sending said message with said tag.

2. The method of claim 1, wherein said receiving a request further comprises:
   providing a set of menu entries to said sender; and
   receiving from said sender a selection signal, indicating that said plurality of persons are to automatically receive said multiple-party receipt notifications.

3. The method of claim 1, further comprising:
   receiving from said sender a selection signal, indicating that said plurality of persons also are to receive said e-mail message; and
   sending said e-mail message to said plurality of persons.

4. The method of claim 1, further comprising:
   receiving said message from said sender;
   providing said message to a recipient; and
   in response to said request, automatically transmitting said multiple-party receipt notifications to said plurality of persons.

5. The method of claim 1, further comprising:
   providing to a user
   a representation of said e-mail message,
   together with information as to who has been provided with the content of said e-mail message;
   wherein said user is one of said plurality of persons.

6. The method of claim 5, further comprising:
   storing and updating said information.

7. The method of claim 1, further comprising at least one limiting action chosen from:
   disabling said multiple-party receipt notifications as to a user, responsive to said user's request;
   limiting said multiple-party receipt notifications' operation, based on a domain policy;
   limiting said multiple-party receipt notifications' operation, based on a permissions policy; and
   limiting the content of said multiple-party receipt notifications.

8. The method of claim 1, further comprising:
   transmitting a secondary receipt notification to said sender;
   wherein said secondary receipt notification notifies said sender that one of said plurality of persons received one of said multiple-party receipt notifications.

9. A method for providing e-mail services, said method comprising:
   receiving a message from a sender;
   providing said message to a recipient; and
   in response to a request from said sender, automatically transmitting multiple-party receipt notifications to a plurality of persons;
   whereby said plurality of persons may be notified that said recipient has been provided with the content of said message.

10. The method of claim 9, further comprising:
    providing to a user
    a representation of said e-mail message,
    together with information as to who has been provided with the content of said e-mail message;
    wherein said user is one of said plurality of persons.

11. The method of claim 10, further comprising:
    storing and updating said information.

12. The method of claim 9, further comprising at least one limiting action chosen from:
    disabling said multiple-party receipt notifications as to a user, responsive to said user's request;
    limiting said multiple-party receipt notifications' operation, based on a domain policy;
    limiting said multiple-party receipt notifications' operation, based on a permissions policy; and
    limiting the content of said multiple-party receipt notifications.

13. The method of claim 9, further comprising:
    transmitting a secondary receipt notification to said sender;
    wherein said secondary receipt notification notifies said sender that one of said plurality of persons received one of said multiple-party receipt notifications.

14. A system for providing e-mail services, said system comprising:
    means for receiving from a sender a request for multiple-party receipt notifications, for an e-mail message;
    means responsive to said request, for creating at least one tag for said message indicating that said plurality of persons are to automatically receive said multiple-party receipt notifications;
    means for providing said message to a recipient;
    means responsive to said tag, for automatically transmitting said multiple-party receipt notifications to said plurality of persons; and
    means for providing limits for said multiple-party receipt notifications.

15. The system of claim 14, further comprising:
    means for providing to a user
    a representation of said e-mail message,
    together with information as to who has been provided with the content of said e-mail message;
    wherein said user is one of said plurality of persons.

16. The system of claim 15, further comprising:
    means for storing and updating said information.

17. The system of claim 14, wherein said means for providing limits further comprises at least one of:
    means for limiting said multiple-party receipt notifications' operation, based on a domain policy;
    means for limiting the content of said multiple-party receipt notifications;
    means for limiting said multiple-party receipt notifications' operation, based on a permissions policy; and
    means responsive to a user's request, for disabling said multiple-party receipt notifications as to said user.

18. The system of claim 14, further comprising:
    means for transmitting a secondary receipt notification to said sender;
    wherein said secondary receipt notification notifies said sender that one of said plurality of persons received one of said multiple-party receipt notifications.

19. A computer-usable medium having computer-executable instructions for providing e-mail services, said computer-usable medium comprising:
    means for receiving a request from a sender, specifying a plurality of persons to receive multiple-party receipt notifications of an e-mail message;

means responsive to said request, for creating at least one tag for said message indicating that said plurality of persons are to automatically receive said multiple-party receipt notifications;

means for providing said message to a recipient;

means responsive to said tag, for automatically transmitting said multiple-party receipt notifications to said plurality of persons; and means for providing limits for said multiple-party receipt notifications.

20. The computer-usable medium of claim 19, further comprising:

means for providing to a user a representation of said e-mail message, together with information as to who has been provided with the content of said e-mail message;

wherein said user is one of said plurality of persons.

21. The computer-usable medium of claim 20, further comprising:

means for storing and updating said information.

22. The computer-usable medium of claim 19, wherein said means for providing limits further comprises at least one of:

means for limiting said multiple-party receipt notifications' operation, based on a domain policy;

means for limiting the content of said multiple-party receipt notifications;

means for limiting said multiple-party receipt notifications' operation, based on a permissions policy; and means responsive to a user's request, for disabling said multiple-party receipt notifications as to said user.

23. The computer-usable medium of claim 19, further comprising:

means for transmitting a secondary receipt notification to said sender;

wherein said secondary receipt notification notifies said sender that one of said plurality of persons received one of said multiple-party receipt notifications.

* * * * *